United States Patent [19]

Wilson

[11] Patent Number: 5,211,984
[45] Date of Patent: May 18, 1993

[54] MEMBRANE CATALYST LAYER FOR FUEL CELLS

[75] Inventor: Mahlon S. Wilson, Los Alamos, N. Mex.

[73] Assignee: The Regents of the University of California, Oakland, Calif.

[21] Appl. No.: 811,220

[22] Filed: Dec. 20, 1991

Related U.S. Application Data

[63] Continuation-in-part of Ser. No. 736,876, Jul. 29, 1991, which is a continuation-in-part of Ser. No. 656,329, Feb. 19, 1991, abandoned.

[51] Int. Cl.[5] .............................................. H01M 4/88
[52] U.S. Cl. ..................................... 427/115; 429/42
[58] Field of Search ...................... 427/115; 429/33, 42

[56] References Cited

U.S. PATENT DOCUMENTS

| | | | |
|---|---|---|---|
| 4,369,103 | 1/1983 | White | 204/252 |
| 4,804,592 | 2/1989 | Vanderborgh et al. | 429/33 |
| 4,876,115 | 10/1989 | Raistrick | 427/115 |
| 4,931,168 | 6/1990 | Watanabe et al. | 429/42 X |

OTHER PUBLICATIONS

A. K. Shukla et al., "A Nafion ®-Bound Platinized Carbon Electrode For Oxygen Reduction In Solid Polymer Electrolyte Cells," 19 J. Appl. Electrochem., pp. 383-386 (1989).
R. B. Moore et al., "Procedure For Preparing Solution-Cast Perfluorosulfonate Ionomer Films And Membranes," 58 Anal. Chem., pp. 2569-2570 (1986).
C. Liu et al., "Ion-Transporting Composite Membranes," 137 J. Electrochem. Soc., No. 10, pp. 3114-3120 (Oct. 1990).

*Primary Examiner*—Stephen Kalafut
*Attorney, Agent, or Firm*—Ray G. Wilson; Paul D. Gaetjens

[57] ABSTRACT

A gas reaction fuel cell incorporates a thin catalyst layer between a solid polymer electrolyte (SPE) membrane and a porous electrode backing. The catalyst layer is preferably less than about 10 μm in thickness with a carbon supported platinum catalyst loading less than about 0.35 mgPt/cm$^2$. The film is formed as an ink that is spread and cured on a film release blank. The cured film is then transferred to the SPE membrane and hot pressed into the surface to form a catalyst layer having a controlled thickness and catalyst distribution. Alternatively, the catalyst layer is formed by applying a Na$^+$ form of a perfluorosulfonate ionomer directly to the membrane, drying the film at a high temperature, and then converting the film back to the protonated form of the ionomer. The layer has adequate gas permeability so that cell performance is not affected and has a density and particle distribution effective to optimize proton access to the catalyst and electronic continuity for electron flow from the half-cell reaction occurring at the catalyst.

5 Claims, 5 Drawing Sheets

MEMBRANE CATALYST LAYER FOR FUEL CELLS

RELATED CASES

This application is a continuation-in-part of U.S. patent application Ser. No. 07/736,876, filed Jul. 29, 1991, which, in turn, is a continuation-in-part of U.S. patent application Ser. No. 07/656,329, now abandoned, filed Feb. 19, 1991.

BACKGROUND OF INVENTION

This invention relates to fuel cells and, more particularly, to catalyst loadings for solid polymer electrolyte fuel cells. This invention is the result of a contract with the Department of Energy (Contract No. W-7405-ENG-36).

Fuel cells are energy conversion devices presently being considered as one alternative to internal combustion engines. One type of fuel cell uses a solid polymer electrolyte (SPE) membrane, or proton exchange membrane, to provide ion exchange between the cathode and anode electrodes. Gaseous fuels may be used within the fuel cell, particularly hydrogen ($H_2$) and oxygen ($O_2$), where the electrodes are formed of porous conductive materials, e.g., woven graphite, to enable the fuel to disperse over the face of the SPE.

SPE fuel cells offer many advantages over liquid electrolyte fuel cells, including greater ultimate power densities, lower operating temperatures, and longer operating lifetimes. SPE materials are also generally resistant to corrosion and easy to incorporate into fuel cell structures. However, the anode and cathode half-cell reactions, $H_2$ and $O_2$ reactions, respectively, require catalysts to proceed at useful rates. As described in U.S. Pat. No. 4,876,115, issued Oct. 24, 1989, and incorporated herein by reference, catalyst materials were first incorporated by hot pressing the materials directly into the surface of the SPE membrane. Useful current densities in conventional SPE fuel cells were achieved only with high catalyst loadings, e.g., 4 mg $Pt/cm^2$. Since the catalyst materials are from the platinum group, with platinum being the preferred catalyst, these SPE fuel cells (herein referred to as GE/HS-UTC-type fuel cells) have not been cost competitive with other energy sources.

The '115 patent is directed to reducing the required platinum loading where the platinum is provided as platinum particles supported on carbon pieces, referred to as a supported catalyst (Pt-C), on a carbon cloth or carbon paper electrode substrate bound together by a hydrophobic component, such as polytetrafluoroethylene (PTFE). The catalyzed sides of the carbon electrodes are impregnated to a depth of about 10 $\mu m$ with a solubilized form of the SPE to increase the access of the electrolyte to the supported platinum catalyst within the impregnated layer. Indeed, catalyst loadings down to 0.35 $mg/cm^2$ of SPE area are reported to provide performance equivalent to conventional fuel cell catalyst loadings of 4 $mg/cm^2$.

The platinum catalyst is not efficiently utilized in the prior art structures. It is difficult to match the impregnation depth of the SPE with the erratic thickness of a typical catalyst layer. This results in areas that are not fully impregnated and other areas where the SPE material extends deeper into the electrode than the catalyst layer and impedes gas diffusion through the electrode. It is also difficult to obtain a high loading, i.e., a high weight percent, of the SPE ionomer to maximize contact between catalyst sites and the ionomer when a impregnation technique is used to introduce the ionomer. Further, the hydrophobic binder blocks proton and oxygen access to catalyst sites in cathode electrodes.

Another problem with prior art fuel cells is differential swelling between the SPE and the catalyst layer arising from the differing hydration characteristics between the hydrophilic SPE membrane and the carbon-based electrode structure. Delamination can occur between the SPE membrane and the electrode with a resulting discontinuity in the ion path and decreased cell longevity.

These problems are addressed by the present invention and a catalyst layer is provided adjacent a fuel cell SPE that is hydrophilic, contains substantially no cavities, is uniformly thin, and contains a uniform ratio of binder ionomer to supported catalyst.

Accordingly, it is an object of the present invention to provide a SPE fuel cell with relatively low supported catalyst loadings with no reduction in performance.

It is another object to provide uniform continuity of electronic and ionic paths about all of the catalyst sites.

Still another object is to provide a uniform dispersion of the supported catalyst layer in the binder layer.

One other object is to improve the bonding between the SPE membrane and the catalyst layer.

Yet another object is to provide a thin catalyst layer for adequate oxygen transport to all the catalyst sites through the ionomer binder material.

Another object is to increase the weight fraction of the SPE ionomer with the catalyst layer to improve the efficiency of the catalyst.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a solid polymer electrolyte (SPE) membrane assembly for use in a gas reaction fuel cell, wherein the improvement comprises a SPE membrane and a film of a proton conducting material with a thickness less than about 10 $\mu m$ and having a supported platinum catalyst uniformly dispersed therein with a platinum loading less than about 0.35 $gm/cm^2$, where said film is adhered to the SPE membrane. A preferred film thickness is less than 5 $\mu m$.

In another characterization of the present invention, a SPE membrane assembly is formed with a catalyst layer fabricated as a separate unit. A selected loading of supported Pt catalyst is uniformly dispersed in an ionomer that is effective for oxygen permeation and for ion transport, where the resulting mixture is formed as a thin film decal. The thin film decal is then transferred to the surface of a SPE membrane to complete the membrane assembly. In one particular embodiment, the ionomer is provided in a $Na^+$ form for high temperature application. In another embodiment, the ionomer is provided in a thermoplastic form for high temperature pressing onto the SPE membrane.

In yet another characterization of the present invention, a SPE membrane assembly for use in a gas reaction fuel cell is formed using a $Na^+$ or thermoplastic form of a perfluorosulfonate ionomer to fabricate a catalyst layer. A supported Pt catalyst and a solvent are uniformly blended with the $Na^+$ or thermoplastic form of the ionomer to form an ink. The ink is applied to form a layer over a surface of a SPE membrane in the $Na^+$ form. The layer is then dried at a temperature of at least 150° C. for a $Na^+$ ionomer and 195° C. for a thermoplastic form of the ionomer. The resulting film and membrane are converted back to the protonated form of the ionomer to form a pliant, elastic, and coherent catalytic layer on the SPE membrane.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figures 1, 1A:
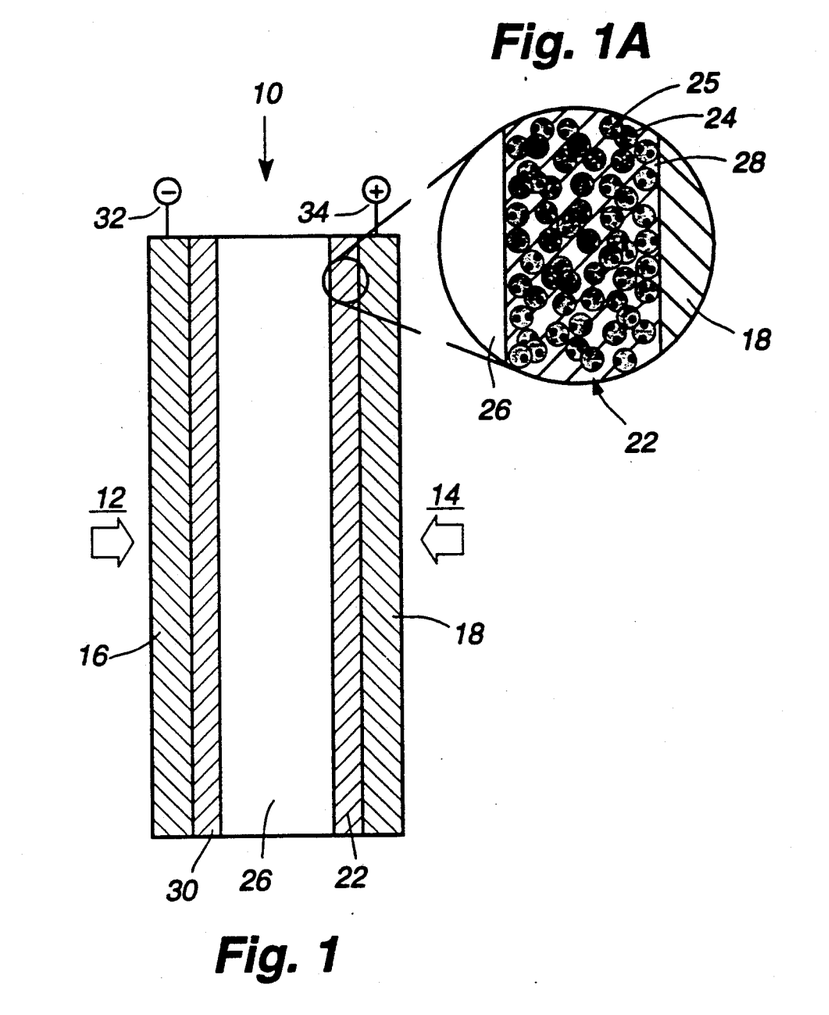
FIG. 1 is a cross section of a fuel cell having a structure in accordance with one embodiment of the present invention.
FIG. 1A is a pictorial illustration showing a magnified view of the catalyst layer according to the present invention.

In accordance with the present invention, a gas reaction fuel cell includes a catalyst layer adjacent the cathode surface of a solid polymer electrolyte membrane to optimize utilization of the catalyst and to minimize the amount of the included catalyst. A catalyst film may also be provided adjacent the anode surface of the solid polymer electrolyte membrane. As shown in FIGS. 1 and 1A, catalyst layer 22 addresses three criteria necessary for a catalyst to efficiently contribute to the electrochemical processes in a fuel cell: proton access to the catalyst, gas access, and electronic continuity.

Fuel cell assembly 10 utilizes a gas fuel source 12, gas oxidizer source 14, solid polymer electrolyte (SPE) membrane 26 between porous anode backing structure 16 and porous cathode backing structure 18, and at least catalyst layer 22, according to the present invention, that is adhered to the cathode surface of SPE 26. It will be understood that catalyst layer 30 may be disposed between membrane 26 and anode backing structure 16. Cathode backing structure 18 is electrically connected to cathode 34 and anode backing structure 16 is electrically connected to anode 32. The foregoing discussion applies also to catalyst layer 30, although catalyst loadings for the anode may be significantly less than one-half the catalyst loadings required for the cathode structure. Catalyst layer 22 is formed as a film of a proton conductive ionomer 28 and a supported platinum (Pt) catalyst 24 uniformly dispersed in ionomer 28 to assure that a uniform and controlled depth of the catalyst is maintained. The resulting film is a dense film of ionomer 28 and supported catalyst 24. i.e., there are no substantial voids in the film and there are no hydrophobic additives, such as PTFE, that block access of the diffusing gas and protons to the Pt catalyst sites. Gas access to the Pt catalyst sites is obtained through porous cathode backing structure 18 and by diffusion through ionomer 28. A suitable ionomer, such as a perfluorosulfonate ionomer, has sufficient oxygen permeability that a diffusion pathway length of 5-10 $\mu$m does not introduce any significant oxygen transport losses through the film for an oxygen gas.

Proton penetration and gas diffusion effects of electrolyte layers, as well as the relationship between volume fraction of ionomer 28 and potential drop within catalyst layer 22, indicate that an optimum catalyst layer 22 is very thin, i.e., a film less than 10 $\mu$m thick, and has a high volume density of supported catalyst 24 with the ionomer 28 in the interstices, i.e., the supporting carbon particles 25 are in contact with adjacent particles to form a low resistance electronic path through catalyst layer 22. A weight ratio of about 1:3 perfluorosulfonate ionomer (dry)/Pt-C is preferred for 20 wt % supported Pt. A dense film 22 is formed that is substantially free of cavities or water pockets that lower the ionic and electronic conductivities. It will be appreciated that the thickness of film 22 is optimized when the thickness is equal to the active region for the half-cell reaction at any given current density and may be selected on the basis of the expected operating characteristics to match the catalyst thickness with a predetermined operating current density.

In one embodiment, film 22 is formed from an ink preparation including the supported catalyst, a solubilized ionomer, and one or more volatile or decomposable suspension materials to provide a viscosity suitable for film formation. The ink is spread over a release blank in one or more layers to form a film decal with a preselected concentration of catalyst. A preferred protocol is as follows:

PROTOCOL I

1. Combine a solubilized perfluorosulfonate ionomer, such as Nafion (a registered trademark of E.I. duPont Nemours) in 5% solution (from Solution Technology, Inc.) and a supported catalyst (19.8 wt % platinum on carbon from Prototech Company, Newton Highlands, Mass.) in a weight ratio of 1:3 Nafion (dry)/Pt-C. Alternate materials of perfluorosulfonate ionomer are available, such as Membrane "C" from Chlorine Engineers, Inc., of Japan and membranes from Dow Chemical Company.

2. Add water and glycerol to weight ratios of about 1:5:20 for carbon/water/glycerol.

3. Agitate the mixture with ultrasound to uniformly disperse the supported catalyst in the ink and to form the mixture to a viscosity suitable for coating the release blank.

4. Clean a release blank of teflon film and coat the blank with a thin layer of mold release (e.g., a TFE spray). Paint the blank with a layer of ink and bake in an oven at 135° C. until dry. Add layers until the desired catalyst loading is achieved.

5. Form an assembly of a polymer electrolyte membrane, counter electrode (anode electrode), and the coated blank. Place the assembly into a conventional hot press and lightly load the press until the press heats to a selected temperature (i e., 125° C. for Nafion and 145° C. for "C" SPE material) and then press at 70-90 atm for 90 seconds.

6. Cool the assembly and then peel the release blank from the film, leaving the film decal adhered to the SPE membrane cathode surface.

7. An uncatalyzed porous electrode (Prototech) is urged against the film during fuel cell assembly to form a gas diffusion backing for the thin film catalyst layer.

It should be recognized that the solubilized Nafion acts to some extent as a surfactant and dispersing agent for the supported catalyst particles. However, the dispersion of the Nafion must be controlled to provide a suitably dense film. An effective density for the present invention is obtained by simply mixing the Pt-C particles and solubilized Nafion together before the water and glycerol mixture is added.

One advantage of the dense catalyst film herein described is improved bonding of the catalyst film to the SPE membrane and continuity of the proton path. The dimensions of the SPE membrane increase considerably upon hydration of the hydrophilic material, whereas the relatively rigid carbon matrix of conventional gas-diffusion electrode structures does not significantly change dimensions upon hydration. Thus, where the catalyst is included within the carbon electrode structure, the continuity between the SPE surface and the catalyst interface can be adversely affected. The dense catalyst film according to the present invention includes a hydrophilic material as a large fraction of the catalyst film and there is less differential movement from surface expansions under hydration.

One disadvantage of forming a catalyst film decal without a binder material, such as PTFE, is that suitable ionomer materials, such as Nafion, must provide structural integrity for the film. Nafion, for example, is not melt processable and the resulting recast catalyst layer films do not have the structural integrity of commercial fluoropolymer SPE membranes. It has been found, however, that the structural integrity can be improved by heating the film to elevated temperatures for moderate amounts of time. This does cause some amount of acid-catalyzed discoloration and degradation, but the increase in structural integrity is beneficial. The film is also rendered somewhat less hydrophilic by the heating, which is beneficial at the cathode electrode where water flooding is of concern. A suitable treatment is thirty minutes exposure at 130°-135° C.

Another approach to improve the structural integrity of the catalyst layer film is to introduce a binder material that readily disperses throughout the electrode structure and imparts structural integrity at low volume fractions such that performance of the electrode is not significantly impaired. Useful catalyst layers have been prepared using polyvinyl alcohol (PVA). The surfactant nature of the PVA provides for adequate dispersion among the supported catalyst particles in an aqueous solution and the molecular structure acts to bind the carbon particles and Nafion agglomerates so that strong films are obtained with low weight fractions of PVA. Films have been formed with PVA concentrations of 10-12 wt % in the ink.

In another embodiment of the present invention, the integrity of catalyst films 22, 30 is improved and acid-catalyzed degradation of the ionomer is avoided by using the $Na^+$ form of the perfluorosulfonate ionomer, i.e., Nafion, to form a film for application to membrane 26 or for direct application to membrane 26, where membrane 26 is in a $Na^+$ or $K^+$ form. The $Na^+$ perfluorosulfonate layer is cured at a temperature of at least 150° C., and preferably at least 160° C., and the catalyzed membrane assembly is thereafter converted to the $H^+$, i.e., protonated, form to complete the catalyzed membrane assembly. A preferred protocol is as follows:

PROTOCOL II

1. Prepare a mixture of Nafion and catalyst as described in Step 1 of Protocol I.

2. Add a molar amount of NaOH equal to the Nafion and mix well to convert the Nafion to the $Na^+$ form.

3. Form an ink as in Steps 2 and 3 of Protocol I.

4. Provide a membrane of $Na^+$ Nafion by soaking a protonated membrane in a solution of NaOH, followed by rinsing and drying, or by procuring the membrane in a $Na^+$ or $K^+$ form.

5. Apply the ink directly to one side of the membrane. The amount of catalyst applied to the membrane is determined from the amount of ink transferred to the surface. Typically, two coats are required to obtain the desired catalyst loading. In one method of drying the ink, the ink-coated membrane is placed on a vacuum table having a fine sintered stainless steel filter on top of a heated vacuum manifold plate. A silicone blanket having a cut-out area the size of the membrane area to be inked is placed over the membrane to seal the uncovered areas of the vacuum table about the membrane. The vacuum table is operated at a temperature of at least 150° C., and preferably about 160° C., as the ink is applied. The vacuum appears to prevent distortion of the membrane from solvents in the ink and to yield a smooth, uniform film. The high-temperature application and drying appears to cure the catalyst layer to a film of high integrity and that is pliant and elastic. The second side of the membrane may be coated in the same manner.

6. Optionally, the assembly is hot pressed at 70-90 atm at 185° C. for about 90 seconds.

7. The assembly is converted back to the protonated form by lightly boiling it in 0.1M $H_2SO_4$ and rinsing in deionized water. The assembly is air dried and combined with an uncatalyzed porous electrode as in Step 7 of Protocol I.

Alternately, the $Na^+$ form of ink (Steps 1-3, above) and membrane may be used in Protocol I to form a separate catalyst film for application to the membrane.

The high-temperature casting of $Na^+$ Nafion films to improve film integrity is generally suggested in Moore et al., "Procedure for Preparing Solution-Cast Perfluorosulfonate Ionomer Films and Membranes," 58 Anal. Chem., pp. 2569-2570 (1986), incorporated herein by reference. The article suggests that solvents such as dimethyl sulfoxide (DMSO) might yield equivalent properties to glycerol solvents, described above, but at lower process temperatures. The above protocol appears to yield equivalent cell performance with both DMSO and glycerol solvents. DMSO does provide a good suspension medium for the solids, however, and may form a good solution for a spray application of ink to the membrane surface.

In yet another embodiment of the present invention, the robustness, i.e., integrity, of the film decal is improved by using a thermoplastic form of a perfluorosulfonate ionomer in the ink solution. The thermoplastic form is obtained by ion-exchange of a hydrophobic cation, such as tetra-butyl ammonium hydroxide (TBAOH) with the proton form of the ionomer. Suitable hydroplastic cations are relatively large molecules (compared to normal cations, e.g., $Na^+$) with hydrophobic organic ligands, such as tetra-butyl ammonium, tetra-propyl ammonium, and the like.

The resulting thermoplastic film on the SPE membrane can now be hot pressed against the membrane at a temperature above the deformation temperature of the perfluorosulfonate ionomer in order to effectively adhere to the SPE membrane. The SPE membrane material is supplied in a $Na^+$ form and the resulting assembly is converted to the protonated form for use in the fuel cell assembly. A preferred protocol is as follows:

PROTOCOL III

1. Prepare a mixture of perfluorosulfonate ionomer, such as Nafion or membrane "C" material, and catalyst as described in Step 1 of Protocol I.

2. Add a molar amount of TBAOH equal to the ionomer to convert the ionomer to the thermoplastic $TBA^+$ form.

3. Form an ink as in Steps 2 and 3 of Protocol I.

4. Provide a membrane of $Na^+$ perfluorosulfonate ionomer as in Step 4 of Protocol II.

5. Apply the ink to the membrane either by decal preparation (Steps 4–6 of Protocol I) or directly to the membrane (Step 5 of Protocol II).

6. Hot press the catalyst layer of the membrane assembly at a temperature above the deformation temperature of the converted ionomer, i.e., preferably at about 195° C., at 70–90 atmospheres for a time effective to form a glassy, smooth finish, e.g., about 90 seconds.

7. Convert the assembly back to a protonated form (Step 7, Protocol II).

The thermoplastic form of the ink is readily applied as either a decal or an ink. Both forms adhere well to the SPE membrane and the hot press at the higher temperature enables the thermoplastic material to deform onto the membrane for an adherent and continuous interface.

FIGS. 2–7 graphically depict the performance of fuel cells prepared according to the present invention. All of the ink formulations were prepared using supported catalysts of 19.8 wt % platinum on XC-72 carbon powder (Prototech) mixed with Nafion. The cathode electrodes for mating with the catalyst layer were conventional PTFE bonded electrodes with no catalyst (Prototech). The fuel cells whose performance is shown in FIGS. 1–4 have cathodes prepared according to Protocol I and include conventional anodes (Prototech) with a catalyst loading of 0.35 mg $Pt/cm^2$ plus a sputter coat of 500 Å Pt. It will be understood that conventional anode electrodes were used to provide performance comparisons of cathode electrodes.

Figure 5:
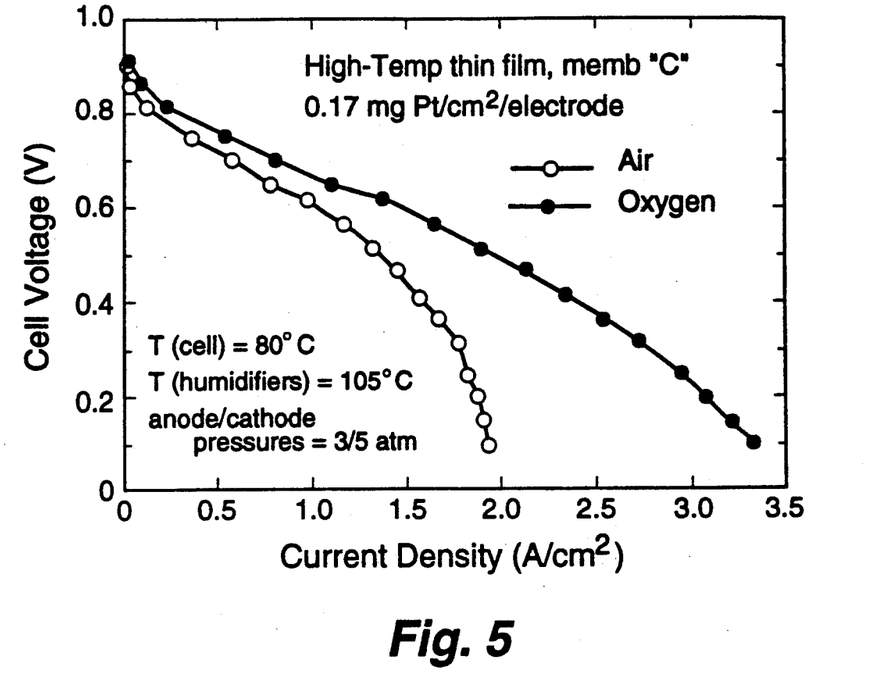
FIG. 5 graphically depicts the performance of a fuel cell with a high-temperature formed, thin film catalyst layer with 0.17 gm Pt/cm$^2$/electrode on Membrane "C".
Figure 6:
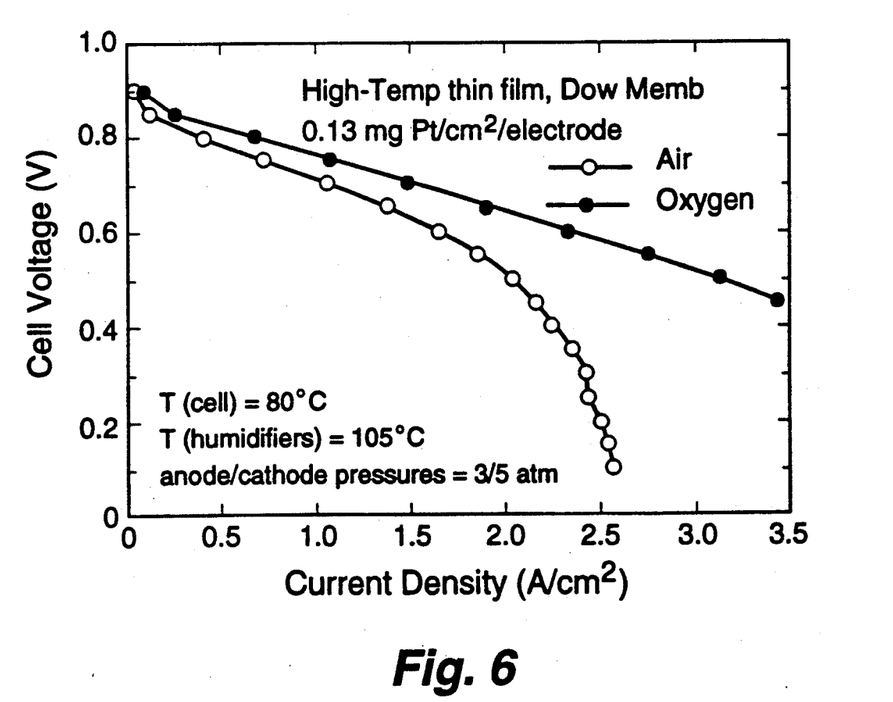
FIG. 6 graphically depicts the performance of a fuel cell with a high temperature formed, thin film catalyst layer with 0.13 mg Pt/cm$^2$/electrode on a Dow membrane.

The anode catalyst loading is not expected to have any significant effect on cell performance. Indeed, the fuel cells whose performance is shown in FIGS. 5 and 6 include high temperature catalytic layers on both the cathode and anode faces of the membrane. Both catalytic layers incorporated equivalent catalyst loadings, e.g., 0.13 mg $Pt/cm^2$, for a total cell loading of 0.26 mg $Pt/cm^2$ of electrode surface. Anodes with catalyst loadings as low as 0.03 mg $Pt/cm^2$ have shown little degradation in fuel cell performance.

Figure 2:
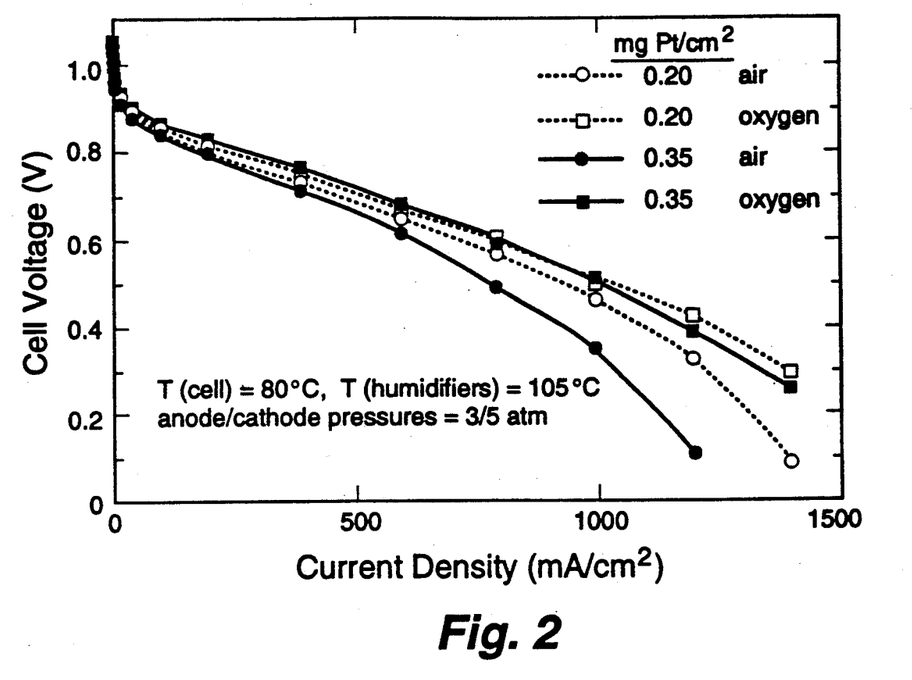
FIG. 2 graphically depicts the performance of a thin catalyst film with 0.20 mg/cm$^2$ and a thicker catalyst film with 0.35 mg/cm$^2$ of platinum on a first SPE.

FIG. 2 graphically depicts the voltage vs. current density curves for fuel cells having conventional Prototech anodes, Nafion 117 (7 mil thick) SPE membrane, and a cathode assembly with a catalyst layer produced by mixing Pt/C catalyst and Nafion and hot pressed onto the SPE membrane Catalyst loadings of 0.20 and 0.35 mg $Pt/cm^2$ are compared using both neat oxygen and air as the oxidant. It is readily seen that the thinner catalyst layer (0.20 mg $Pt/cm^2$) performs somewhat better than the thicker film (0.35 mg $Pt/cm^2$) at higher current densities. At the higher current densities, the active region of the catalyst layer narrows and less of the film thickness is utilized, wherein mass transfer losses increase in the thicker film and performance decreases. The low partial pressure of oxygen in air as compared to neat oxygen induces an earlier and steeper fall-off in performance at the higher current densities.

Figure 3:
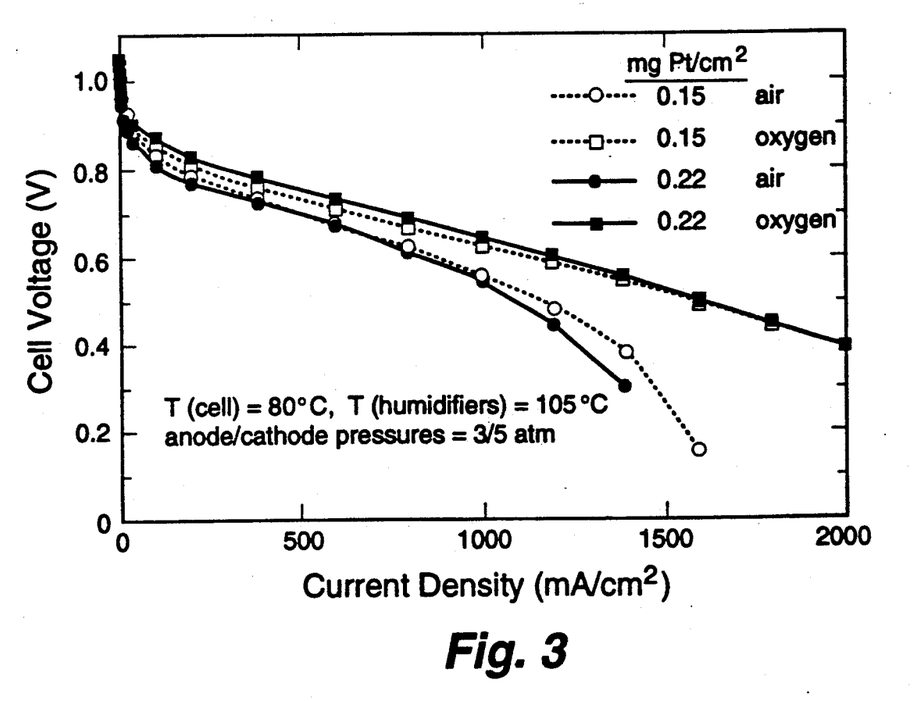
FIG. 3 graphically compares performance of thin catalyst films with 0.15 and 0.22 mgPt/cm$^2$ on a second SPE.

FIG. 3 graphically depicts the voltage vs. current density curves for fuel cells constructed as the fuel cells of FIG. 2, except that the SPE membrane is Membrane "C" (a perfluorosulfonate membrane from Chlorine Engineers Inc. of Japan). Catalyst loadings of 0.15 and 0.22 mg $Pt/cm^2$ are compared, again using both neat oxygen and air as oxidizers. The results are consistent with the results shown with Nafion 117 forming the SPE membrane, with lower potentials from the thicker film at higher current densities.

Figure 4:
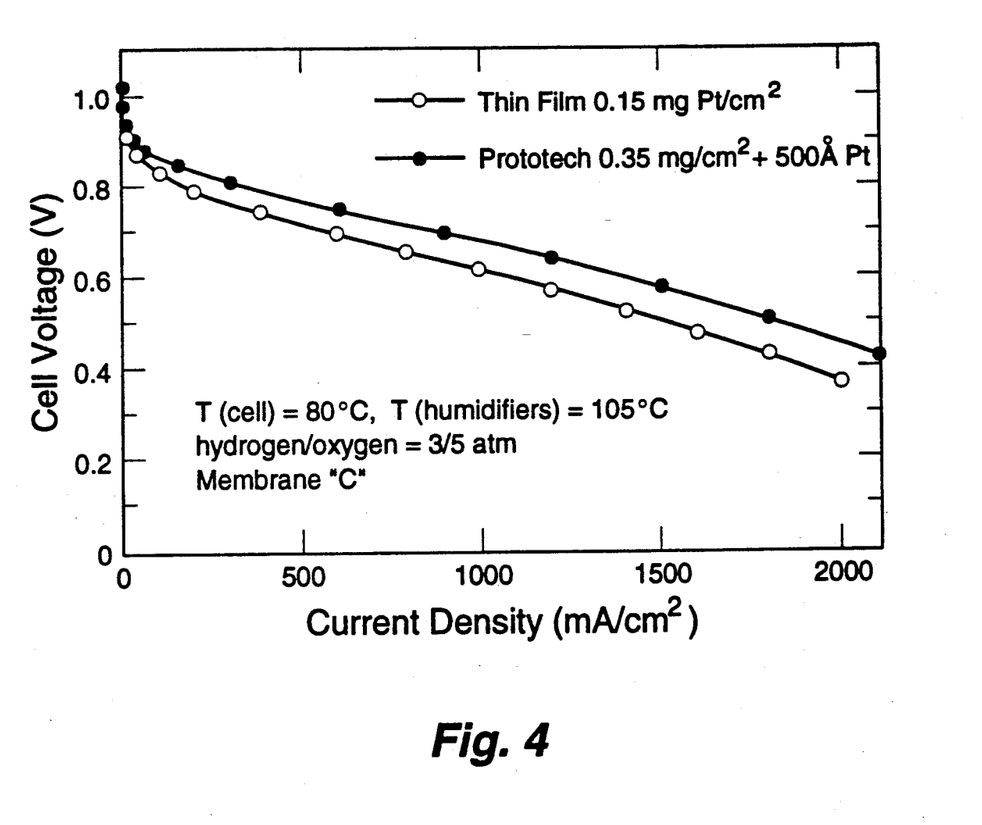
FIG. 4 graphically compares the performance of a thin film cathode according to the present invention with 0.15 mgPt/cm$^2$ and a commercial gas-diffusion cathode with 0.35 mgPt/cm$^2$.

The performance of the fuel cells depicted in both FIGS. 2 and 3 approach those of fuel cells fabricated with conventional Prototech cathode assemblies or of assemblies using unsupported Pt catalyst with much higher Pt loadings FIG. 4 particularly compares the cell voltage vs. current density performance of a thin catalyst layer with a loading of 0.15 mg $Pt/cm^2$ with a cell having the catalyst included in a carbon electrode to a loading of 0.35 mg $Pt/cm^2$ with an extra sputter coating of 500 Å Pt. The substantial similarity in performance is readily apparent.

The performance of fuel cells formed by a direct application of a $Na^+$ ink to a $Na^+$ membrane is shown in FIGS. 5 and 6. FIG. 5 depicts the performance of the high-temperature, thin film formed on Membrane "C" according to Protocol II, wherein the cell performance on oxygen is at least equal to the performance of the separate thin film cell shown in FIG. 4. FIG. 6 depicts the performance of the high-temperature, thin film formed on a "Dow" membrane according to Protocol II, wherein an improved cell performance is obtained. The "Dow" membrane is a proton conducting membrane available from the Dow Chemical Company. It is quite significant that a low Pt loading of 0.13 mg $Pt/cm^2$ is effective to generate current densities of above 3 $A/cm^2$ at a cell voltage higher than 0.4 V for operation on pressurized oxygen and, particularly, that such a low loading is effective to reach a cell voltage of 0.65 V at 1 $A/cm^2$ for cells operated on pressurized air.

Figure 7:
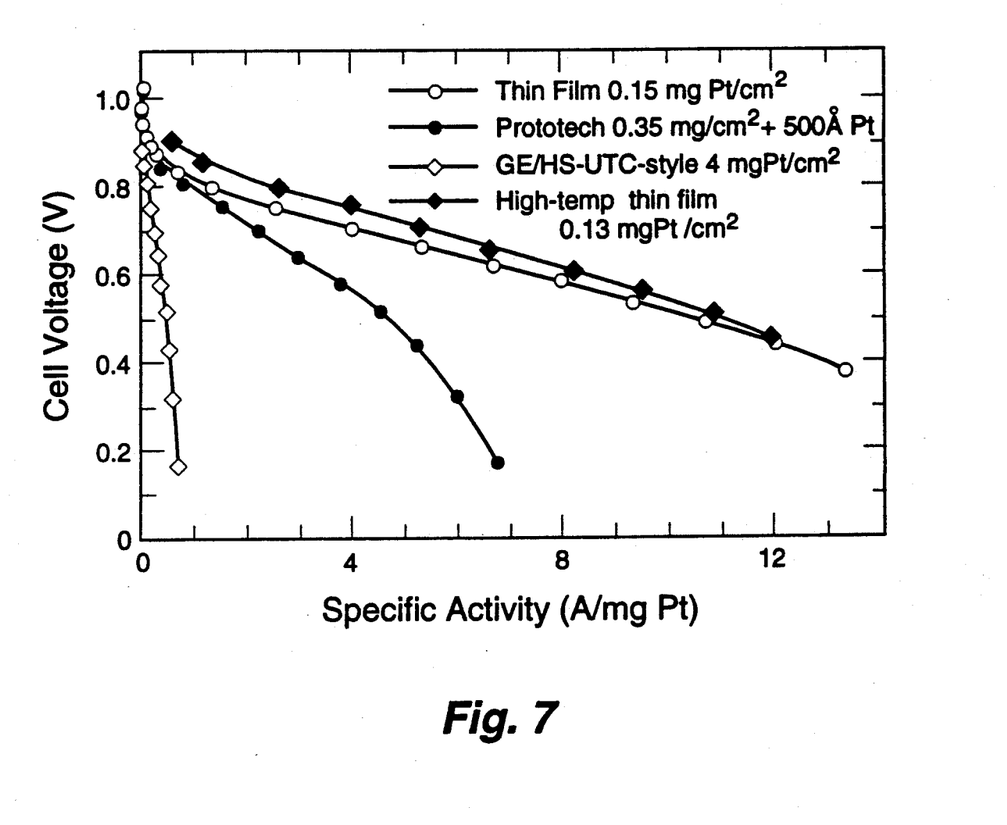
FIG. 7 graphically compares the specific activity from a fuel cell according to the present invention and prior art fuel cells.

To further illustrate the significant increase in catalyst utilization efficiency afforded by the present invention, FIG. 7 depicts cell voltage as a function of the specific activities of the cathodes (A/mgPt) for fuel cells with four different cathode catalyst configurations: (1) a thin film catalyst loading of 0.15 mg Pt/cm$^2$, as taught herein; (2) a high-temperature thin film with a catalyst loading of 0.13 mg Pt/cm$^2$ applied directly to the membrane as an ink; (3) a commercial Prototech electrode with a catalyst loading of 0.35 mg Pt/cm$^2$ and 500 Å Pt coating; and (4) GE/HS-UTC-type cell with 4 mg Pt/cm$^2$ (unsupported) hot pressed into the SPE. It should be noted that the GE/HS-UTC-type cell has hardware, membrane design, and operating conditions that are significantly different from the other cells and its performance comparison is merely illustrative. The differences in the specific activities for each type of electrode are clearly significant, with the thin film supported catalyst layers according to the present invention being the most efficient utilization of the Pt catalyst.

Fuel cell performance using catalyzed membranes formed with the TBA+ form of the perfluorosulfonate ionomer is generally the same as the performance obtained from membranes formed with the Na+ form of the ionomer as shown in FIGS. 5-7.

Thus, it will be appreciated that the present invention obtains a high catalyst utilization by the improved construction of the catalyst layer with low Pt loadings primarily involving increased contact area between the polymer electrolyte and the Pt catalyst clusters. The contact area is increased in two ways. First, the supported catalyst and the ionomeric additive are cast together to form the catalytic layer, wherein the catalyst has a very high weight fraction of ionomer (about 25 wt %) compared with the weight fraction from the impregnated electrode structure of the '115 patent (about 10 wt %). Second, the hydrophobic additive is completely eliminated and the ionomer is uniformly dispersed throughout the catalyst layer. The latter is accomplished by blending the solubilized ionomer and the platinized carbon into a homogeneous "ink," from which the thin film catalyst layer is formed.

FIGS. 2 and 3 illustrate the significance of film thickness affecting proton penetration and gas access and the resulting cell performance. As current density increases, the active catalyst region narrows. Thus, the oxidizer gas and/or protons must diffuse through inactive portions of the catalyst layer and, in the case of air, the mass transfer limitation further increases the overpotential. An electrode thickness roughly equivalent to that of the active region at a particular current density would provide an optimum performance at that current density. For example, with 20 wt % Pt/C supported catalyst and a catalyst layer fabricated in accordance with the above principles, reasonable fuel cell performance is obtained down to about 0.1 mg Pt/cm$^2$, after which it falls off in proportion to further decrease in catalyst loading. Concomitant film thicknesses are in the range of 1-10 μm, and preferably 2 to 3 μm. It is observed that catalyst loadings as low as 0.03 mg Pt/cm$^2$ may be used for an anode catalyst layer without significant loss of performance. Improved performance might be obtained from a given catalyst layer thickness if a higher Pt loading could be included without increasing the thickness of the supported catalyst.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for fabricating a SPE membrane assembly for use in a gas reaction fuel cell, comprising the steps of:

furnishing a SPE membrane in Na+ form;

furnishing a perfluorosulfonate ionomer in a Na+ form or thermoplastic form;

uniformly dispersing a supported Pt catalyst and a solvent in said Na+ or said thermoplastic form of said ionomer to form an ink;

forming a film of said ink containing a predetermined amount of said catalyst on a surface of said SPE membrane in said Na+ form;

heating said film of said ink to a temperature effective to dry said ink; and converting said film of said ink and said SPE membrane to a protonated form of perfluorosulfonate.

2. A method according to claim 1, wherein the step of furnishing said perfluorosulfonate ionomer in a Na+ form includes the step of adding NaOH to a protonated form of said perfluorosulfonate ionomer.

3. A method according to claim 1, further including the step of maintaining said membrane in a planar condition on a vacuum table while forming said film of said ink on said membrane.

4. A method according to claim 1, wherein the step of furnishing said perfluorosulfonate ionomer in a thermoplastic form includes the step of ion-exchange of a hydrophobic cation with said perfluorosulfonate.

5. A method according to claim 4, wherein said hydrophobic cation is tetra-butyl ammonium.

* * * * *